Jan. 5, 1937. W. S. BERRY 2,066,819
AIRCRAFT ENGINE SYNCHRONIZING SYSTEM
Filed April 17, 1935 2 Sheets-Sheet 1
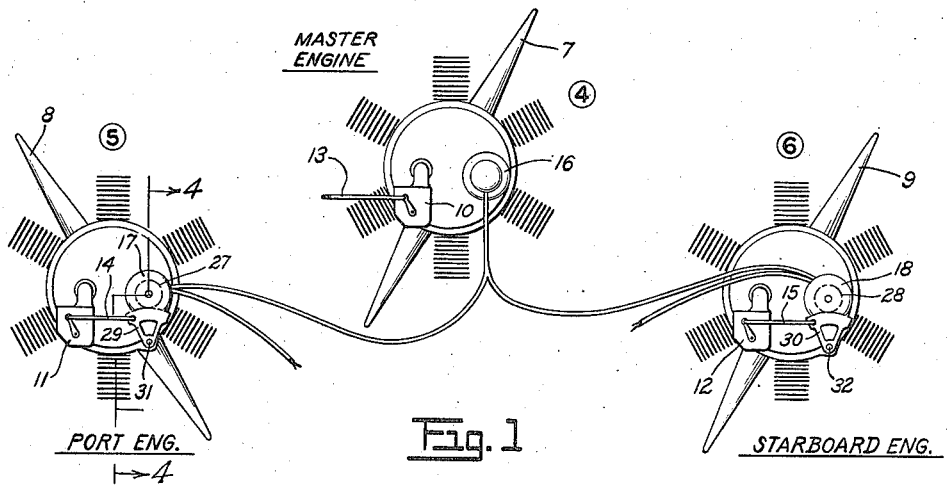
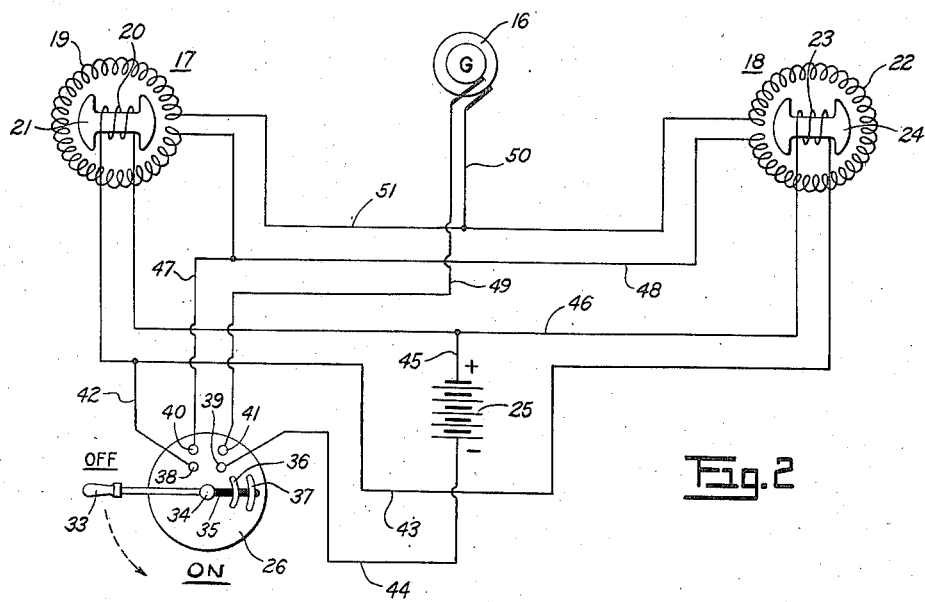
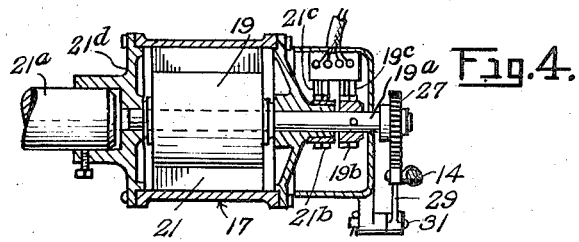
INVENTOR.
William S. Berry
BY
Stephen Cerstvik
ATTORNEY.

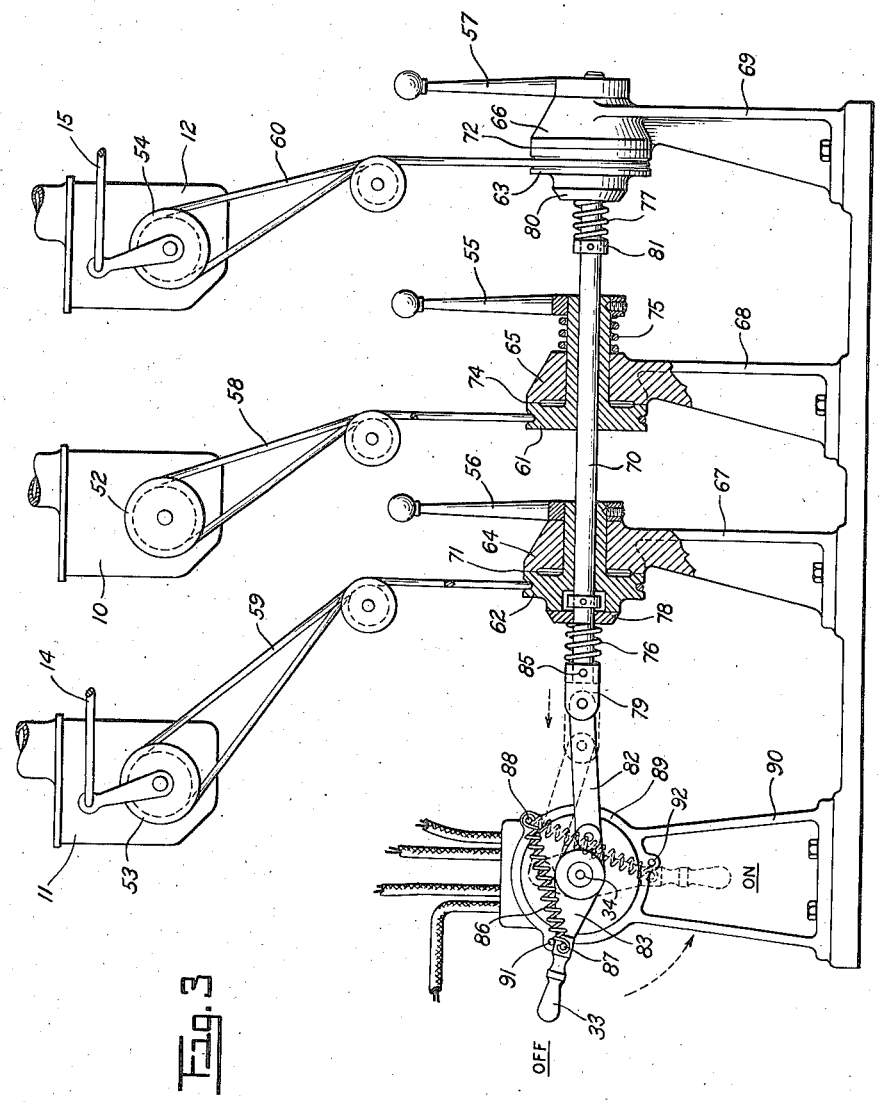

Patented Jan. 5, 1937

2,066,819

UNITED STATES PATENT OFFICE 2,066,819

AIRCRAFT ENGINE SYNCHRONIZING SYSTEM

William S. Berry, Hagerstown, Md., assignor to Pioneer Instrument Company, Inc., Brooklyn, N. Y., a corporation of New York Application April 17, 1935, Serial No. 16,935

5 Claims. (Cl. 60—97)

The present invention relates to apparatus for electrically synchronizing the engines and propellers of a multi-engine aircraft.

One of the objects of the invention is to provide novel electrical apparatus for automatically controlling the speed control means of a plurality of aircraft engines each driving a respective propeller, so that said propellers will rotate in fixed speed relation, i. e., so that they will rotate in synchronism.

Another object is to provide novel electrical apparatus for automatically controlling the speed control means of a plurality of aircraft engines so that they will continuously operate in synchronism with a master engine the operation of which is controlled manually to maintain a predetermined speed whereby all of said engines will operate in fixed speed relation.

Another object is to provide a novel electrical apparatus for maintaining a plurality of propellers of a multi-engine aircraft at the same predetermined speed.

Another object is to provide a novel electrical control apparatus for a multi-engine aircraft whereby the engines of the aircraft, and hence the respective propellers thereof, are automatically maintained in synchronism, thus eliminating excessive periodical vibrations of the structure of the craft and preventing a weakening thereof.

Another object of the invention is to provide a novel electrical control apparatus for the internal combustion engines of a multi-engine aircraft whereby manual operation of the individual engine throttles is rendered unnecessary to maintain the engines and their respective propellers in synchronism, thus reducing the pilot's labors and consequently increasing the safety factor in air travel.

A further object is to provide a novel switch mechanism in automatic control apparatus of the class described whereby the operator or pilot may quickly and conveniently render the automatic control ineffective and resort to individual manual control of the respective engines or the propellers driven thereby.

A still further object is to provide novel electrical apparatus for synchronizing a controlled engine of an aircraft with a master engine thereof, comprising means for producing a periodically reversing magnetic field by the operation of one engine and reversing at a frequency corresponding to the speed of said engine, means for producing a second periodically reversing magnetic field by the operation of the other engine and reversing at a frequency corresponding to the speed of said other engine, means for combining said two fields, whereby a change in phase relation is produced between said fields when the latter are reversing out of synchronism due to a difference in speed of the two engines, and means effective when said change in phase relation takes place, for regulating the speed of the controlled engine to that of the master engine.

Other objects and advantages of the invention will appear more fully hereinafter from a consideration of the detailed description which follows, taken together with the accompanying drawings wherein one embodiment of the invention is illustrated. It is to be expressely understood, however, that the drawings are for the purposes of illustration and description only and are not designed as a definition of the limits of the invention, reference being had for this purpose to the appended claims.

The invention consists substantially in the construction, combination, location and relative arrangement of parts and electrical circuits for obtaining the results desired in accordance with the foregoing objects, as will be more fully hereinafter set forth in the specification, as shown in the drawings, by way of example, and as finally pointed out in the claims.

In the drawings wherein like reference characters refer to like parts throughout the several views:

Fig. 1 is a more or less schematic view illustrating one embodiment of the invention as applied to a three-engine aircraft.

Fig. 2 is a circuit diagram illustrating the manner of connecting the electrical elements of the novel combination constituting the invention;

Fig. 3 is a view in elevation illustrating one form of novel switching mechanism connected to the individual speed control means of the respective aircraft engines whereby the automatic control may be rendered ineffective and the engines controlled individually by their respective speed control means; and Fig. 4 is a detail section of the device 17 taken on line 4—4 of Fig. 1.

In accordance with the invention, two or more aircraft engines are synchronized by providing an alternating current generator connected to and driven by one of the engines, which will be called the master engine, for generating an alternating current having a frequency corresponding to the speed of said master engine. At the other engine, which will be hereafter referred to as the controlled engine, there is provided a synchronous device such as a relatively small synchronous motor having a relatively rotatable stator but which is normally stationary and a rotatable field winding or rotor which is rotated by said controlled engine at a speed corresponding to the speed of said controlled engine whereby the field produced by said field winding is periodically reversed at a frequency corresponding to the speed of said controlled engine. The normally stationary but relatively rotatable stator is electrically connected to and energized by the alternating current from the master engine the speed of which is manually controlled.

When the controlled engine is operating at the same speed as the master engine, the alternating current field in the stator is reversing at the same frequency as the field produced by the field winding which is rotated by the controlled engine and, therefore, no change in phase relation takes place between the field of the stator and the field of the field winding as both fields are in synchronism and, hence, no relative rotation is produced between the two field windings. If, however, the speed of the controlled engine increases or decreases with respect to the speed of the master engine, a corresponding increase or decrease in the frequency of reversal of the field of the field winding with respect to the frequency of reversal of the stator field will take place thereby producing a change in phase relation which will cause the relatively rotatable stator to move angularly in one direction or another from its normally stationary position and an amount corresponding to the magnitude of the change in phase relation between the two rotating fields. This relative rotation of the stator of the synchronous motor is employed, in accordance with the invention, to actuate the speed control means, such as the carburetor valve, of the controlled engine and, therefore, said stator is connected to said speed control means of said controlled engine and in such a manner that when the speed of the controlled engine decreases below that of the master engine, said speed control means will be actuated to increase the speed of said controlled engine until said speed corresponds to the speed of the master engine. As the controlled engine begins to increase in speed, the stator of the synchronous motor gradually moves back to its original normally stationary position, said position being reached at the instant when the speed of the controlled engine is the same as that of the master engine.

If the speed of the controlled engine should increase with respect to that of the master engine, the reverse action will take place, namely, the stator of the synchronous motor will move angularly in an opposite direction to actuate the speed control means of said controlled engine in such a manner as to decrease the speed thereof.

Referring now to the drawings and more particularly to Fig. 1, there is shown one embodiment of the invention as applied to a multi-engine aircraft which is maintained in flight by three internal combustion engines 4, 5 and 6 which rotate their respective propellers 7, 8 and 9. Engine 4 is, in the present instance, the center engine and is employed as the master engine, and engines 5 and 6 constitute the port (left) and starboard (right) engines, respectively, the view being from the rear of the engines, and are the controlled engines which are to be controlled by the master engine 4 in order to maintain their speeds in synchronism with said master engine.

Each of the engines is provided with a speed control means such as a fuel supply device for regulating the amount of fuel to said engine to vary the speed thereof. In the form shown, said means are constituted by carburetors 10, 11 and 12 located at engines 4, 5 and 6, respectively. The feed valves of said carburetors are adapted to be actuated in any suitable manner as by means of rods 13, 14 and 15, respectively. Since engine 4 is the master engine, the rod 13 is manually actuated to operate the speed valve of carburetor 10 in order to establish a predetermined cruising speed at which the aircraft is to be maintained and to which speed the engines 5 and 6 are to be synchronized. The rods 14 and 15 of the engines 5 and 6, however, are adapted to be actuated automatically as will appear hereinafter.

At the master engine 4 there is provided an alternator or alternating current generator 16 which is drivably connected to said engine in any suitable manner (not shown) for generating alternating current the frequency of which corresponds to the speed of the engine by virtue of the driving connection of the generator to said engine. The field of said generator may be excited from the battery 25 or any other suitable source of direct current, or the generator may be of the type having a stationary armature coil and a rotating field constituted by a rotating permanent bar magnet. At each of the controlled engines 5 and 6 there is provided a relatively small synchronous electric motor, the one for engine 5 being shown at 17 and the one for engine 6 being shown at 18.

One of the small synchronous electric motors, namely, motor 17, is shown in sectional detail in Fig. 4 and includes a stator 19 carried on a shaft 19a and is relatively stationary but is adapted to rotate under certain conditions as will appear more fully hereinafter. The stator 19 is provided with an alternating current winding shown in Fig. 2 and is supplied with current through collector rings 19b and brushes 19c from generator 16. Cooperating with stator 19 is a rotor 21 carried by the casing 21d secured to and rotatable with the shaft 21a which is adapted to be driven by the engine 5. The rotor 21 is provided with a direct current winding 20 shown in Fig. 2, said winding being supplied with current through slip rings 21b and brushes 21c from the source 25.

Referring now to the circuit diagram of Fig. 2, each of the synchronous motors 17 and 18 consists of a relatively rotatable alternating current winding which is normally stationary and which will be referred to as the armature, and a direct current field winding wound on a rotatable core providing diametrically opposed pole pieces. The alternating current stator, the direct current field winding and the core of the synchronous motor 17 are shown at 19, 20, and 21, respectively. The corresponding elements of the synchronous motors 18 are shown at 22, 23, and 24, respectively. The direct current windings 20 and 23 are connected, preferably in parallel, to a suitable source of direct current such, for example, as a battery 25, through a switch 26 which will be described more fully hereinafter. The alternating current windings 19 and 22 of said synchronous motors 17 and 18, respectively, are connected, preferably in parallel, to the generator 16 of the master engine through said switch 26 so that the frequency of the alternating current at the winding 19 will be the same as that of the alternating current in winding 22, said frequency corresponding to the speed of the master engine 4 which drives the generator 16. The core members 21 and 24 of said motors 17 and 18 are drivably connected in any suitable manner (not shown) to the engines 5 and 6, respectively, so as to be rotated at speeds corresponding to the speeds of the respective engines to which they are connected. Inasmuch as core members 21 and 24 are rotatable, the associated field windings 20 and 23 will be energized by the battery 25 through suitable collector rings and brushes as set out previously in the description of Figure 4.

By virtue of the rotation of the core members 21 and 24 which carry the field windings 20 and 23, respectively, the direct current fields produced by said windings 20 and 23 will be periodically reversed at a frequency corresponding to the speeds of the respective engines which drive said core members 21 and 24. The fields produced by the alternating current windings 19 and 22 will also be periodically reversed at the frequency of the alternating current produced by the generator 16, which frequency corresponds to the speed of the master engine which drives said generator. Therefore, if the controlled engines 5 and 6 are operated at the same speed as the master engine 4 the fields produced by the windings 20 and 23 will be reversed at the same frequency as the fields produced by the stator windings 19 and 22. Thus the fields of each synchronous motor are in synchronism and no change in phase relation takes place so that said windings 19 and 22 remain stationary. If, however, the speed of engine 5 or that of engine 6 increases or decreases with respect to the speed of the master engine 4, then the speed of rotation of the members 21 or 24 will increase or decrease correspondingly, thereby correspondingly increasing or decreasing the frequency of reversal of the field produced by the winding 20 or winding 23 with respect to the frequency of reversal of the field produced by the winding 19 or winding 22. When this occurs, then a change in phase relation takes place and the winding 19 or 22 will move angularly in one direction or another to follow the increase or decrease and in an amount corresponding to the magnitude of the change in phase relation between the associated windings whereby the change in phase relation may be utilized for the purpose of actuating the speed control means of the respective controlled engines.

Means are now provided for employing the change in phase relation between the rotating fields in the manner indicated above and, in the form shown, said means comprising a gear member 27 (Fig. 1) on the synchronous motor 17 and a similar gear member 28 on the synchronous motor 18, said gear members being connected to or driven by the stators 19 and 22, respectively, when relative rotation thereof takes place. The gear members 27 and 28 are arranged to mesh with gear sectors 29 and 30, respectively, which are pivoted at 31 and 32, respectively, for angular movement when actuated by their respective gears 27 and 28. The gear sector 29 is then connected to the actuating rod 14 of the carburetor 11 and the gear sector 30 is correspondingly connected to the actuating rod 15 of the carburetor 12 and in such a manner that when the speeds of the engines 5 and 6 increase with respect to that of the engine 4, the relative rotation of the stators 19 and 22 of the synchronous motors 17 and 18 will cause the gear sectors 29 and 30 to operate the rods 14 and 15 to decrease the fuel supply from the carburetors 11 and 12 and, hence, to decrease the speed of the corresponding engines. On the other hand, when the speed of the engines 5 and 6 decreases with respect to that of the master engine 4, the actuating rods 14 and 15 will be operated to increase the fuel supplies from the carburetors 11 and 12 and, hence, to increase the speed of the corresponding engines until the controlled engines are in synchronism with the master engine.

Means are now provided for rendering the above control mechanism ineffective when desired and, in the present instance, such means are constituted by the switch 26 referred to hereinbefore. In the form shown said switch comprises a handle member 33 pivoted at 34 for angular movement about said pivot and is provided with an insulating extension or arm 35 on which are carried radially spaced arcuate contact strips 36 and 37. Arranged to cooperate with the contact strips 36 and 37 are two pairs of fixed contacts 38, 39 and 40, 41. The fixed contacts 38 and 39 are adapted to be bridged by the contact strip 36 and the fixed contacts 40, 41 are adapted to be bridged by the contact strip 37 when the handle member 33 is moved substantially ninety degrees in a counter clockwise direction, as is indicated by the arrow, thereby placing the switch in an "on" position from the "off" position in which it was before. The contact 38 is connected by means of a lead 42 to a lead 43 which connects one end of each of the field windings 20 and 23 together. The contact 39 is connected by means of a lead 44 to one side of the battery 25 and the other side of said battery is connected by means of a lead 45 to a lead 46 which connects the other ends of the windings 20, 23 together, thereby connecting said windings in parallel with the battery 25 when the contact strip 36 bridges the contacts 38, 39.

Contact 40 is connected by means of a lead 47 to a lead 48 which connects one of the ends of the armature windings 19 and 22 together and the contact 41 is connected by means of a lead 49 to one terminal of the alternating current generator 16. The other terminal of generator 16 is connected by means of a lead 50 to a lead 51 which connects the other ends of the armature windings 19 and 22 together so that said windings are connected in parallel with the generator 16 through the contacts 40 and 41 when the latter are bridged by the contact strip 37 of the switch 26.

Means are also provided, if desired, whereby the automatic control of the controlled engines may be rendered ineffective and each engine controlled individually by separate manual controls. Preferably, such means are made to operate simultaneously with the switch 26 so that when the latter is in an "off" position the separate manual controls of the engines can be operated individually only and when the switch is in the "on" position, the individual manual controls of the controlled engines are connected to their respective engines in such a manner that they will not interfere with the automatic control and will be operated in synchronism with the master control by the automatic control mechanism.

One embodiment of such switching means is shown in Fig. 3 of the drawings and, in the form illustrated, includes a pulley 52 provided at the carburetor 10 of the master engine, said pulley being substituted for the control rod 13 shown in Fig. 1. Corresponding pulleys 53 and 54 are provided at the carburetors 11, 12 of the port and starboard engines, respectively. These pulleys, however, are provided in addition to the actuating rods 14 and 15 which are automatically operated by the armatures of the synchronous motors 17 and 18, respectively.

The pulleys 52, 53 and 54 are adapted to be manually operated by means of throttle levers 55, 56 and 57, respectively, which are located at some convenient place within reach of the pilot of the aircraft, and for this purpose said pulleys 52, 53 and 54 are connected by means of endless cables 58, 59 and 60, respectively, to pulleys 61, 62 and 63, respectively, to which are secured the respective throttle levers 55, 56 and 57 in any suitable manner as by means of screws which engage tubular extensions provided on said pulleys as shown in the cross-sections of pulleys 61 and 62.

The pulleys 61, 62 and 63 are journaled in journal heads 65, 64 and 66, respectively, which are carried by or formed integrally with supporting brackets 68, 67 and 69, respectively. Said pulleys are also journaled on a non-rotatable longitudinally movable shaft 70 which extends through all of said pulleys and their tubular extensions in the manner shown in Fig. 3, said shaft 70 constituting a friction control rod for the purpose of frictionally disengaging the pulleys 62 and 63 from the journal heads 64 and 66, respectively, said pulleys 62 and 63 and their associated journal heads 64 and 66, having friction surfaces which are adapted to engage as shown at 71 and 72. The pulley 61 also frictionally engages its associated journal head 65 as shown at 74.

The pulley 61 which is connected to the pulley 52 of the carburetor 10 of the master engine is held in frictional engagement with its associated journal head 65 by means of a compression coil spring 75 interposed between the journal head 65 and the throttle lever 55 so that when said throttle lever 55 is moved angularly on the shaft or rod 70 it will remain in any position into which it is moved. Pulleys 62 and 63 are likewise held in frictional engagement with their cooperating journal heads 64 and 66 by means of coil springs 76 and 77, respectively, spring 76 being interposed between a flange 78 and the end of a yoke member 79 carried by rod 70, while the spring 77 is interposed between a corresponding flange 80 and a collar 81 secured to the shaft or rod 70.

Means are now provided for longitudinally moving the friction control rod 70 to reduce the friction between the pulleys 62, 63 and their associated journal heads 64 and 66 when the control rods 14 and 15 are to be actuated automatically by the synchronous motors 17 and 18, thereby permitting said pulleys 62 and 63 to freely rotate on the rod 70 and hence to permit the throttle levers 56 and 57 which are connected thereto to follow the movements of the pulleys 53 and 54 as they are actuated by the control rods 14 and 15 in order to insure that said throttle levers 56 and 57 will be free to assume positions corresponding to the position of the lever 55 which is always manually operated to control the speed of the master engine. In the form shown said means comprise a toggle mechanism including a link 82 which is pivotally connected at one end to the yoke 79 and at its other end to a manually operable lever 83 which is pivoted at 84, said yoke 79 being connected to one end of the rod 70 by means of the pin 85. A toggle spring 86 is provided, one end of which is connected to a pin 87 carried by the lever 83 and the other end of which is connected to a fixed pin 88 carried by a casing 89, within which the switch 26 shown in Fig. 2 and described hereinbefore, is located, said casing being carried by the support 90. Stops 91 and 92 are provided on the casing 89, which serve to limit the angular movement of the lever 83 between the "off" and the "on" positions of said lever.

The position in which the lever 83 is shown in Fig. 3 is the "off" position and at this time the rod 70 is at the limit of its longitudinal movement to the right thereby causing the coil springs 76 and 77 to press the pulleys 62 and 63 into firm frictional engagement with their associated journal heads 64 and 66 by means of the flanges 78 and 80 so that the throttle levers 56 and 57 can be actuated only manually by the operator or pilot in order to overcome the friction at the surfaces 71 and 72. When, however, the lever 83 is moved downwardly, as viewed in Fig. 3, to the "on" position shown in dotted lines, the link 82 is moved upwardly to the position shown, thereby actuating the rod 70 to the left so that the pressure of the springs 76 and 77 on the flanges 78 and 80 is substantially reduced, consequently reducing the friction between the pulleys 62, 63 and their cooperating journal heads 64 and 66. When the friction of the pulleys 62 and 63 is thus reduced they are substantially free to follow the movements of the pulleys 53 and 54 to which they are connected and thereby permit the throttle levers 56 and 57 to assume positions corresponding to the position of the manually operated throttle lever 55 which is the only one operated by the pilot when the lever 83 is in the "on" position because at this time the carburetors 11 and 12 are controlled automatically by the control rods 14 and 15.

In order that the circuits of the synchronous motors 17 and 18 may be rendered ineffective at the same time that it is desired to actuate the throttle levers 56 and 57 manually, the lever 83 is connected to the arm 35 of the switch 26 in any suitable manner (not shown), said switch 26, as previously stated, being housed within the case of 89. A handle member 33 is provided on the lever 83 for moving the lever 83 into the "off" and "on" positions and, hence, for simultaneously actuating the arm 35 of the switch 26.

There is thus provided, in accordance with the invention, a novel electrical apparatus for automatically controlling the speed of the engines of a multi-engine aircraft to maintain the propellers thereof in synchronism by automatically controlling the fuel supply means of those engines which are to be synchronized with a master engine, the speed of the latter being controlled by manual operation of its fuel supply means. Novel means are also provided whereby the automatic control can be readily and quickly rendered inoperative when desired and the speed of each engine controlled manually and individually.

Although only one embodiment of the invention has been illustrated and described, various changes and modifications which will now appear to those skilled in the art may be made without departing from the general scope of the invention. Reference is, therefore, to be had to the appended claims for a definition of the limits of the invention.

What is claimed is:

1. In a multi-engine aircraft having a master engine and a controlled engine, each driving a respective propeller for maintaining the craft in flight, apparatus for automatically synchronizing said engines and their respective propellers, comprising an electric motor at the controlled engine and having a pair of relatively rotatable coils, means operated by the master engine for causing one of said coils to produce a reversing magnetic field which reverses in accordance with the speed of said master engine, means operated by the controlled engine for causing the other coil to produce a reversing field which reverses in accordance with the speed of said controlled engine, whereby relative rotation takes place between said coils due to a change in phase relation produced between the two fields by a difference in speed of the two engines, and means actuated by the relative rotation of said coils for regulating the speed of the controlled engine to that of the master engine whereby said engines and their respective propellers are maintained in synchronism.

2. In a multi-engine aircraft having a master engine and a controlled engine, each driving a respective propeller for maintaining the craft in flight, apparatus for automatically synchronizing said engines and their respective propellers, comprising an electric motor at the controlled engine and having a pair of relatively rotatable coils, means operated by the master engine for causing one of said coils to produce a reversing magnetic field which reverses in accordance with the speed of said master engine, means operated by the controlled engine for causing the other coil to produce a reversing field which reverses in accordance with the speed of said controlled engine, whereby relative rotation takes place between said coils due to a change in phase relation produced between the two fields by a difference in speed of the two engines, and means actuated by the relative rotation of said coils for regulating the speed of the controlled engine to that of the master engine whereby said engines and their respective propellers are maintained in synchronism, and manually operable means located within reach of the pilot of the craft when the latter is in flight for rendering the automatic control apparatus ineffective whereby the speed of each engine may be controlled individually by the pilot.

3. In an aircraft having a plurality of propellers which are required to rotate in fixed speed relation, each propeller having an engine for driving it including means for controlling the speed thereof, manually operable means for actuating the speed controlling means of one of said engines, and automatically operable means for actuating the speed controlling means of the other engines to maintain the speeds of the latter in synchronism with the first engine and comprising a member at each of said other engines and driven thereby, and a cooperating freely movable member for each of said driven members, one of each pair of said members providing magnetic poles of fixed polarity and the other of each pair of said members having a winding adapted to be energized by an alternating current to provide an alternating current field cooperating with the poles of fixed polarity, and means operated by the first engine for generating and supplying an alterating current for each of said windings at a frequency corresponding to the speed of said first engine.

4. In an aircraft having a plurality of propellers which are required to rotate in fixed speed relation, each propeller having an engine for driving it including means for controlling the speed thereof, manually operable means for actuating the speed controlling means of one of said engines, and automatically operable means for actuating the speed controlling means of the other engines to maintain the speeds of the latter in synchronism with the first engine and comprising a member at each of said other engines and driven thereby, and a cooperating freely movable member for each of said driven members, one of each pair of said members providing magnetic poles of fixed polarity and the other of each pair of said members having a winding adapted to be energized by an alternating current to provide an alternating current field cooperating with the poles of fixed polarity, and means operated by the first engine for generating and supplying an alternating current to each of said windings at a frequency corresponding to the speed of said first engine, and manually operable means for simultaneously disconnecting the automatically operable means from said other engines and for cutting off the supply of alternating current to said windings whereby said other engines may be operated individually and independently of the first engine.

5. In a multi-engine aircraft having a master engine and a controlled engine, each driving a respective propeller for maintaining the craft in flight, apparatus for automatically synchronizing said engines and their respective propellers, comprising an electric motor at the controlled engine and having a pair of windings, means operated by the master engine for causing one of said windings to produce a reversing magnetic field which reverses in accordance with the speed of said master engine, means operated by the controlled engine for causing the other winding to produce a reversing magnetic field which reverses in accordance with the speed of said controlled engine, whereby relative rotation takes place between said windings due to a change in phase relation produced between the two fields by a difference in speed of the two engines, and means actuated by such relative rotation for regulating the speed of the controlled engine to that of the master engine whereby said engines and their respective propellers are maintained in synchronism.

WILLIAM S. BERRY.